(12) United States Patent
Pietrek et al.

(10) Patent No.: US 7,770,183 B2
(45) Date of Patent: Aug. 3, 2010

(54) INDIRECT EVENT STREAM CORRELATION

(75) Inventors: Paul Matthew Pietrek, Issaquah, WA (US); Brian R. Crawford, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 11/699,630

(22) Filed: Jan. 30, 2007

(65) Prior Publication Data

US 2008/0184268 A1    Jul. 31, 2008

(51) Int. Cl.
    *G06F 13/00*    (2006.01)
(52) U.S. Cl. .................. 719/318; 719/330; 718/100; 709/205; 709/231; 709/237
(58) Field of Classification Search ............. 719/318, 719/330; 718/100; 709/205, 231, 237
See application file for complete search history.

(56) References Cited

U.S. PATENT DOCUMENTS

| | | | |
|---|---|---|---|
| 6,336,139 | B1 | 1/2002 | Feridun et al. |
| 6,446,136 | B1 | 9/2002 | Pohlmann et al. |
| 6,618,766 | B1 | 9/2003 | Eshghi |
| 6,985,920 | B2 | 1/2006 | Bhattacharya et al. |
| 6,993,246 | B1 | 1/2006 | Pan et al. |
| 7,003,781 | B1 | 2/2006 | Blackwell et al. |
| 7,437,359 | B2 * | 10/2008 | Aguilar-Macias et al. ........ 1/1 |
| 7,454,761 | B1 * | 11/2008 | Roberts et al. ............ 719/318 |
| 7,523,463 | B2 * | 4/2009 | Sluiman et al. ........... 719/318 |
| 2002/0183864 | A1 * | 12/2002 | Apel et al. .................. 700/14 |
| 2003/0195959 | A1 | 10/2003 | Labadie et al. |
| 2004/0024767 | A1 | 2/2004 | Chen |
| 2004/0237093 | A1 | 11/2004 | Sluiman et al. |
| 2005/0010930 | A1 * | 1/2005 | Vaught ................... 719/318 |
| 2005/0183068 | A1 | 8/2005 | Cwalina et al. |
| 2006/0059270 | A1 * | 3/2006 | Pleasant et al. .......... 709/237 |
| 2007/0265945 | A1 * | 11/2007 | Schimpf et al. ........... 705/35 |

OTHER PUBLICATIONS

Gruschke Boris, "Integrated Event Management: Event Correlation Using Dependency Graphs".
Sanchez, et al., "Event Correlation: Language and Semantics".
Yoneki, et al., "Unified Semantics for Event Correlation over Time and Space in Hybrid Network Environments", Date: 2005.

\* cited by examiner

*Primary Examiner*—Andy Ho

(57) ABSTRACT

Various technologies and techniques are disclosed that indirectly correlate event streams on multiple computers. Event details are retrieved for multiple data streams from each of the computers. The event details include a task identifier and ordering identifier for each event in the data streams on each computer. The task identifiers and ordering identifiers are unique to each computer, allowing the events to be correlated with the other events on the same computer only. A uniqueness token is retrieved that provides direct correlation information about how a particular event on the first computer is directly correlated to a particular event on the second computer. An indirect event stream correlation process uses the directly correlated information in combination with the respective task identifiers and respective ordering identifiers from the first and second computers to establish an ordering between the events on the first computer and the events on the second computer.

20 Claims, 9 Drawing Sheets

INDIRECT EVENT STREAM CORRELATION

BACKGROUND

In today's world of technology, it is common for applications to execute on more than one computer. For example, one procedure for a software application may call a procedure on another computer, such as over the Internet or other network. Such software applications that execute on more than one computer are called distributed systems. Many distributed systems write diagnostic data to an output stream in order to make them easier to debug. However, these output streams are not always shared by each component of the distributed system. For this reason, data streams sometimes must be merged in order for the event execution to be analyzed in the proper order. One reason data streams must sometimes be merged is to illustrate when the flow of operation left one component and entered another. The act of matching the flow of operation is often called "event correlation".

Some distributed systems perform event correlation based upon time. Time-based correlation can be problematic because of clock synchronization issues. In other words, it is not always easy or possible to determine how the time on one computer translates into the time on another computer so that events from both machines can be temporally ordered. Another approach to correlation that has been used involves the placement of certain logging details into all of the calls between components to log various details that can be analyzed to re-construct the order of events. Such logging requires modification to existing components in order to support the correlation.

SUMMARY

Various technologies and techniques are disclosed that indirectly correlate event streams on multiple computers. Event details are retrieved for multiple data streams from each of the computers. The event details include a task identifier and ordering identifier for each event in the data streams on each computer. The task identifiers and ordering identifiers are unique to each computer, allowing the events to be correlated with the other events on the same computer only. A uniqueness token is retrieved that provides direct correlation information about how a particular event on the first computer is directly correlated to a particular event on the second computer. An indirect event stream correlation process uses the directly correlated information in combination with the respective task identifiers and respective ordering identifiers from the first and second computers to establish an ordering between the events on the first computer and the events on the second computer.

In one implementation, the indirect event stream correlation process is used with a utility such as a debugger and/or profiler to allow a user to view a series of events that occurred across multiple computers.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
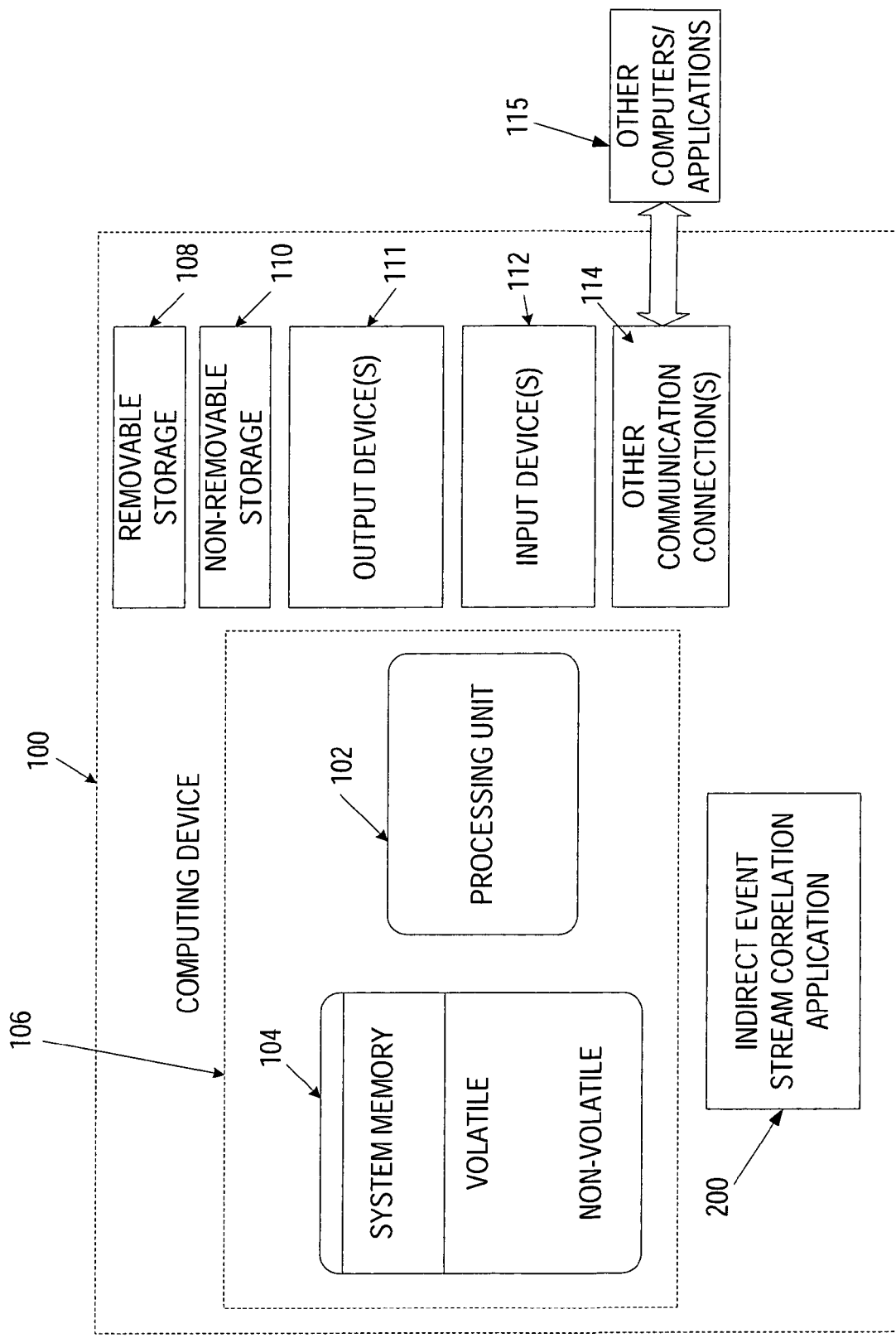
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides debugging capabilities, but the system also serves other purposes in addition to these. In one implementation, one or more of the techniques described herein can be implemented as features within a software development program such as MICROSOFT® VISUAL STUDIO®, or from any other type of program or service that allows for creation, debugging, and/or analysis of applications.

In one implementation, a system is provided that allows applications to be analyzed and/or debugged across the multiple computers they are executing on. An indirect event stream correlation process is able to correlate multiple event streams that do not have correlation data in them, and that do not have synchronized clock values across logical components. A direct correlation is established between a particular event on a first computer with a particular event on a second computer. This direct correlation is used, along with task identifiers and ordering identifiers that are unique to each computer to establish a relationship between all of the events and assemble the events into a complete list of events across the computers. In other words, using a single piece of directly correlated data across the computers, along with the event task and ordering information on each respective computer, the entire event list can also be indirectly correlated. The complete list of events across computers can then be presented to the user of the debugger or other application for review.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes indirect event stream correlation application 200. Indirect event stream correlation application 200 will be described in further detail in FIG. 2.

Figure 2:
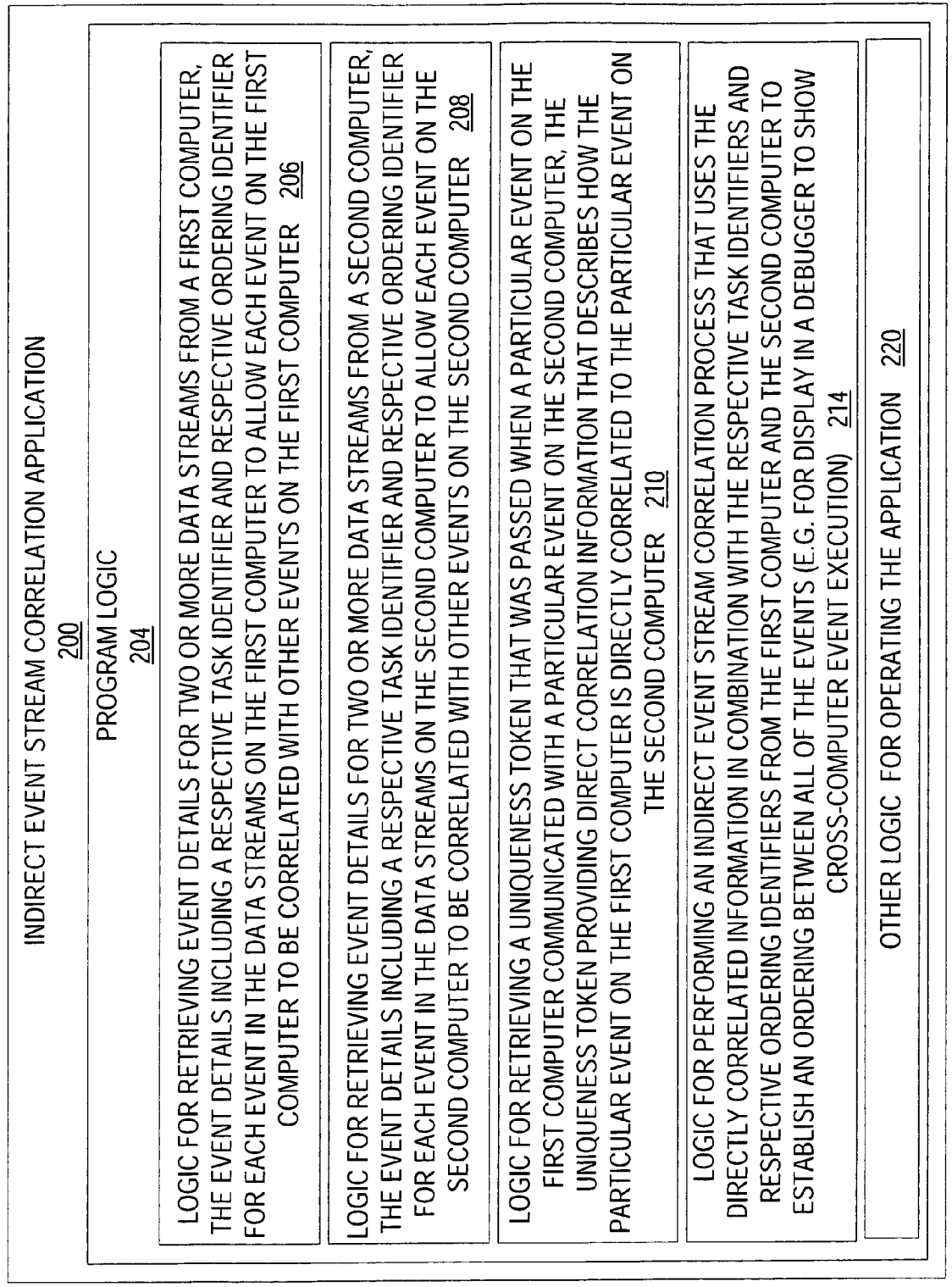
FIG. 2 is a diagrammatic view of an indirect event stream correlation application of one implementation operating on the computer system of FIG. 1.

Turning now to FIG. 2 with continued reference to FIG. 1, an indirect event stream correlation application 200 operating on computing device 100 is illustrated. Indirect event stream correlation application 200 is one of the application programs that reside on computing device 100. However, it will be understood that indirect event stream correlation application 200 can alternatively or additionally be embodied as computer-executable instructions on one or more computers and/or in different variations than shown on FIG. 1. Alternatively or additionally, one or more parts of indirect event stream correlation application 200 can be part of system memory 104, on other computers and/or applications 115, or other such variations as would occur to one in the computer software art.

In one implementation, indirect event stream correlation application 200 is included as part of a debugger and/or analyzer application. Indirect event stream correlation application 200 includes program logic 204, which is responsible for carrying out some or all of the techniques described herein. Program logic 204 includes logic for retrieving event details for two or more data streams from a first computer, the event details including a respective task identifier and respective ordering identifier for each event in the data streams on the first computer to allow each event on the first computer to be correlated with other events on the first computer 206; logic for retrieving event details for two or more data streams from a second computer, the event details including a respective task identifier and respective ordering identifier for each event in the data streams on the second computer to allow each event on the second computer to be correlated with other events on the second computer 208; logic for retrieving a uniqueness token that was passed when a particular event on the first computer communicated with a particular event on the second computer, the uniqueness token providing direct correlation information that describes how the particular event on the first computer is directly correlated to the particular event on the second computer 210; logic for performing an indirect event stream correlation process that uses the directly correlated information in combination with the respective task identifiers and respective ordering identifiers from the first computer and the second computer to establish an ordering between all of the events (e.g. for display in a debugger to show cross-computer event execution) 214; and other logic for operating the application 220. In one implementation, program logic 204 is operable to be called programmatically from another program, such as using a single call to a procedure in program logic 204.

Figure 3:
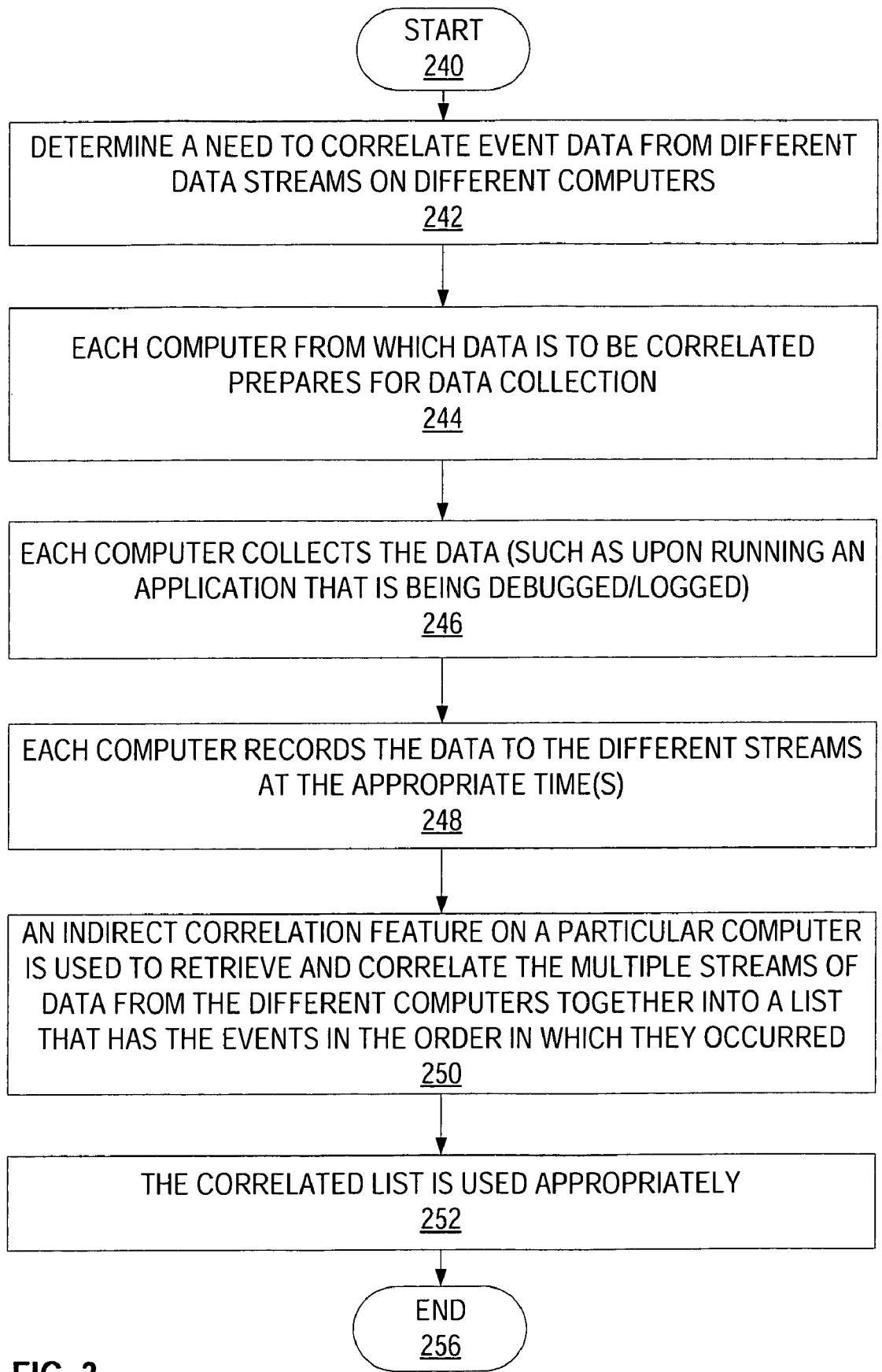
FIG. 3 is a high-level process flow diagram for one implementation of the system of FIG. 1.

Turning now to FIGS. 3-7 with continued reference to FIGS. 1-2, the stages for implementing one or more implementations of indirect event stream correlation application 200 are described in further detail. FIG. 3 is a high level process flow diagram for indirect event stream correlation application 200. In one form, the process of FIG. 3 is at least partially implemented in the operating logic of computing device 100. The procedure begins at start point 240 with determining a need to correlate event data from different data streams on different computers (stage 242). Each computer from which data is to be correlated prepares for data collection (stage 244). Each computer collects the data (such as upon running an application that is being debugged/logged) (stage 246).

Each computer records the data to the different streams at the appropriate time(s) (stage 248). In one implementation, multiple streams on each computer were originally created because of different requirements. For example, a first stream on a particular computer may contain lightweight events representing method execution, and contain no causality information linking it to events on another computer. A second stream on the particular computer may contain a different format event, such as one for event tracing, and may have some causality information relating it to another computer. The same or similar scenario could apply to the other computer(s).

An indirect correlation feature on a particular computer is used to retrieve and correlate the multiple streams of data from the different computers together into a list that has the events in the order in which they occurred (stage 250). The correlated list is used appropriately (stage 252). The process ends at end point 256.

Figure 4:
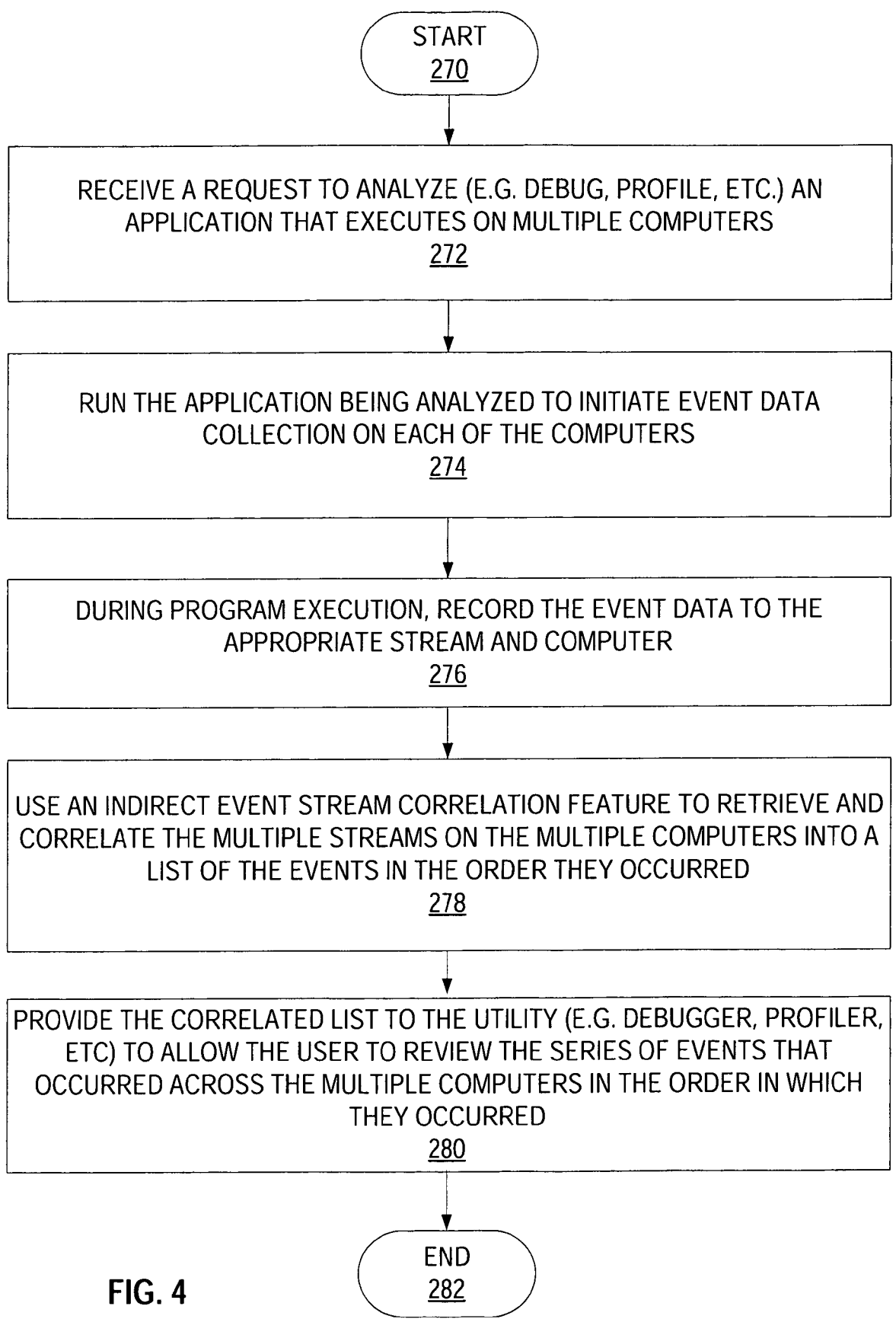
FIG. 4 is a process flow diagram for one implementation that illustrates the high level stages involved in providing event details across computers for a debugger.

FIG. 4 illustrates one implementation of the high level stages involved in providing event details across computers for a debugger. In one form, the process of FIG. 4 is at least partially implemented in the operating logic of computing device 100. The procedure begins at start point 270 with receiving a request to analyze an application that executes on multiple computers (stage 272). The system runs the application being analyzed to initiate event data collection on each of the computers (stage 274). During program execution, the event data is recorded to the appropriate stream and computer (stage 276). An indirect event stream correlation feature is used to retrieve and correlate the multiple streams on the multiple computers into a list that has the events in the order in which they occurred (stage 278). The correlated list is provided to the utility (e.g. debugger, profiler, etc.) to allow the user to review the series of events that occurred across the multiple computers in the order in which they occurred (stage 280). The process ends at end point 282.

Figure 5:
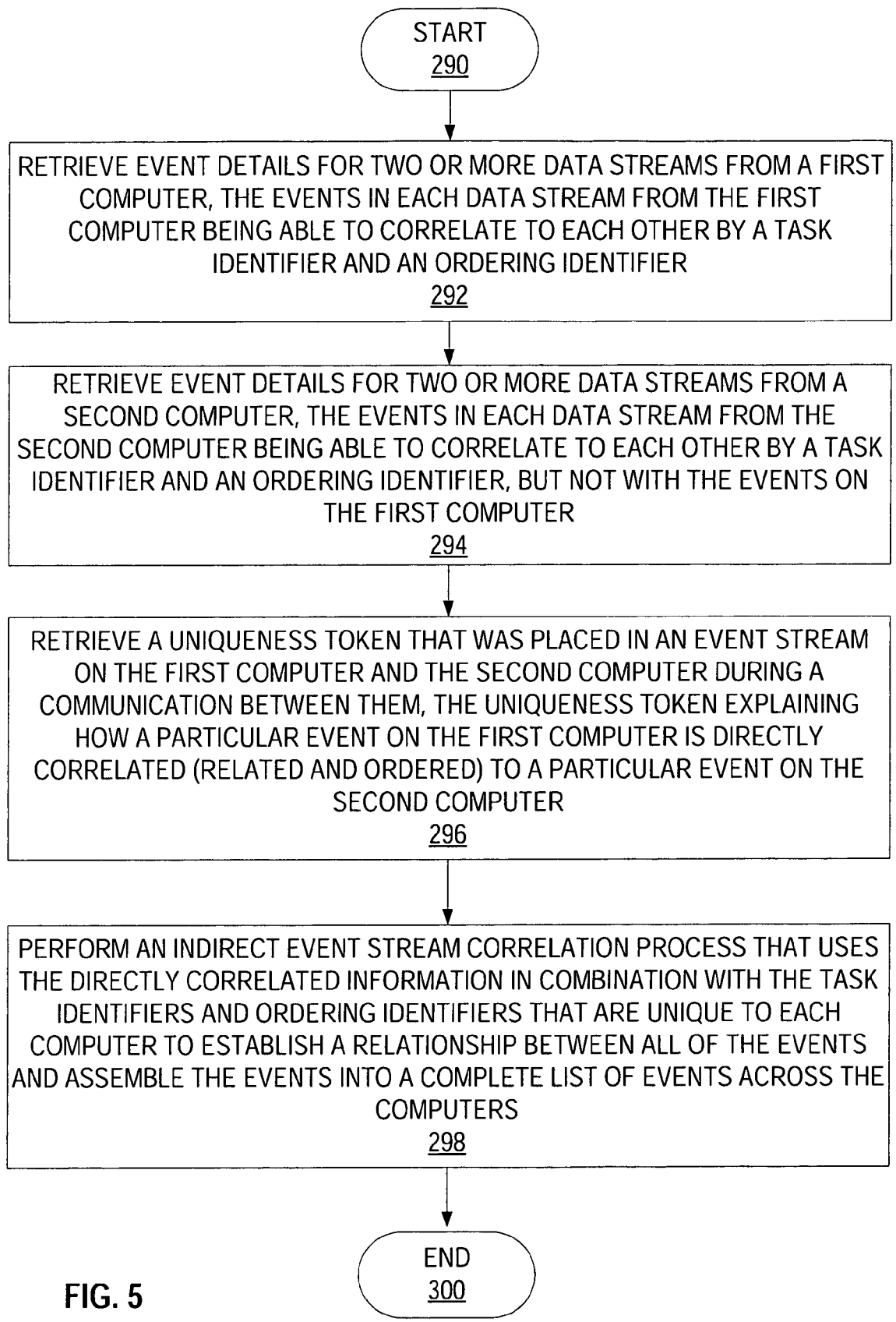
FIG. 5 is a process flow diagram for one implementation that illustrates the high level stages involved in an indirect event stream correlation process used to correlate data across two computers.

FIG. 5 illustrates one implementation of the high level stages involved in an indirect event stream correlation process used to correlate data across two computers. In one form, the process of FIG. 5 is at least partially implemented in the operating logic of computing device 100. The procedure begins at start point 290 with retrieving event details for two or more data streams from a first computer, the events in each data stream from the first computer being able to correlate to each other by a task identifier and an ordering identifier (stage 292). Event details are retrieved for two or more data streams from a second computer, the events in each data stream from the second computer being able to correlate to each other by a task identifier and an ordering identifier, but not with the events on the first computer (stage 294).

A uniqueness token is retrieved that was placed into an event stream on each computer when a communication between them took place (stage 296). The uniqueness token explains how a particular event on the first computer is directly correlated (related and ordered) to a particular event on the second computer (stage 296). In one implementation, the uniqueness token appears in an event on the first computer and in an event on the second computer, and facilitates direct correlation between the particular two events. An indirect event stream correlation process is performed that uses the directly correlated information in combination with the task identifiers and ordering identifiers that are unique to each computer to establish a relationship between all of the events and assemble the events into a complete list of events across the computers (stage 298). The process ends at end point 300.

Figure 6:
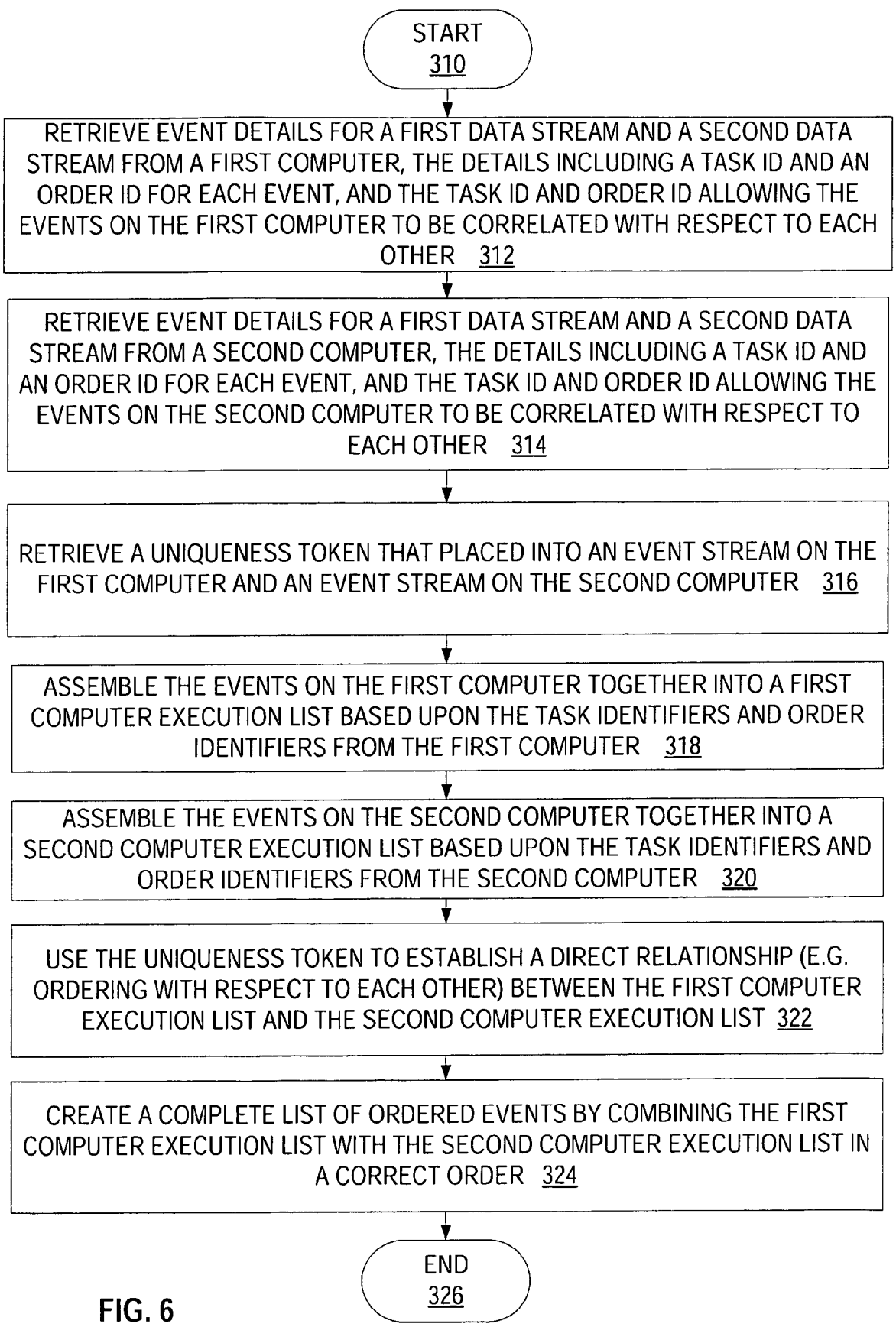
FIG. 6 is a process flow diagram for one implementation that illustrates the more detailed stages involved in an indirect event stream correlation process used to correlate data across two computers.

FIG. 6 illustrates one implementation of the more detailed stages involved in an indirect event stream correlation process used to correlate data across two computers. In one form, the process of FIG. 6 is at least partially implemented in the operating logic of computing device 100. The procedure begins at start point 310 with retrieving event details for a first data stream and a second data stream from a first computer (stage 312). The details include a task identifier and an order identifier for each event, and the task identifier and the order identifier allowing the events on the first computer to be correlated with respect to each other (stage 312). Event details are retrieved for a first data stream and a second data stream on a second computer (stage 314). The details include a task id and an order id for each event, and the task id and order id allowing the events on the second computer to be correlated with respect to each other (stage 314), but not with the events on the first computer.

The system retrieves a uniqueness token that was placed in an event stream on the first computer and in an event stream on the second computer (stage 316). The events on the first computer are assembled together into a first computer execution list based upon the task identifiers and order identifiers from the first computer (stage 318). The events on the second computer are assembled together into a second computer execution list based upon the task identifiers and order identifiers from the second computer (stage 320). The uniqueness token is used to establish a direct relationship (e.g. ordering with respect to each other) between the first computer execution list and the second computer execution list (stage 322). A complete list of ordered events is created by combining the first computer execution list and the second computer execution list in a correct order (stage 324). The process ends at end point 326.

Figure 7:
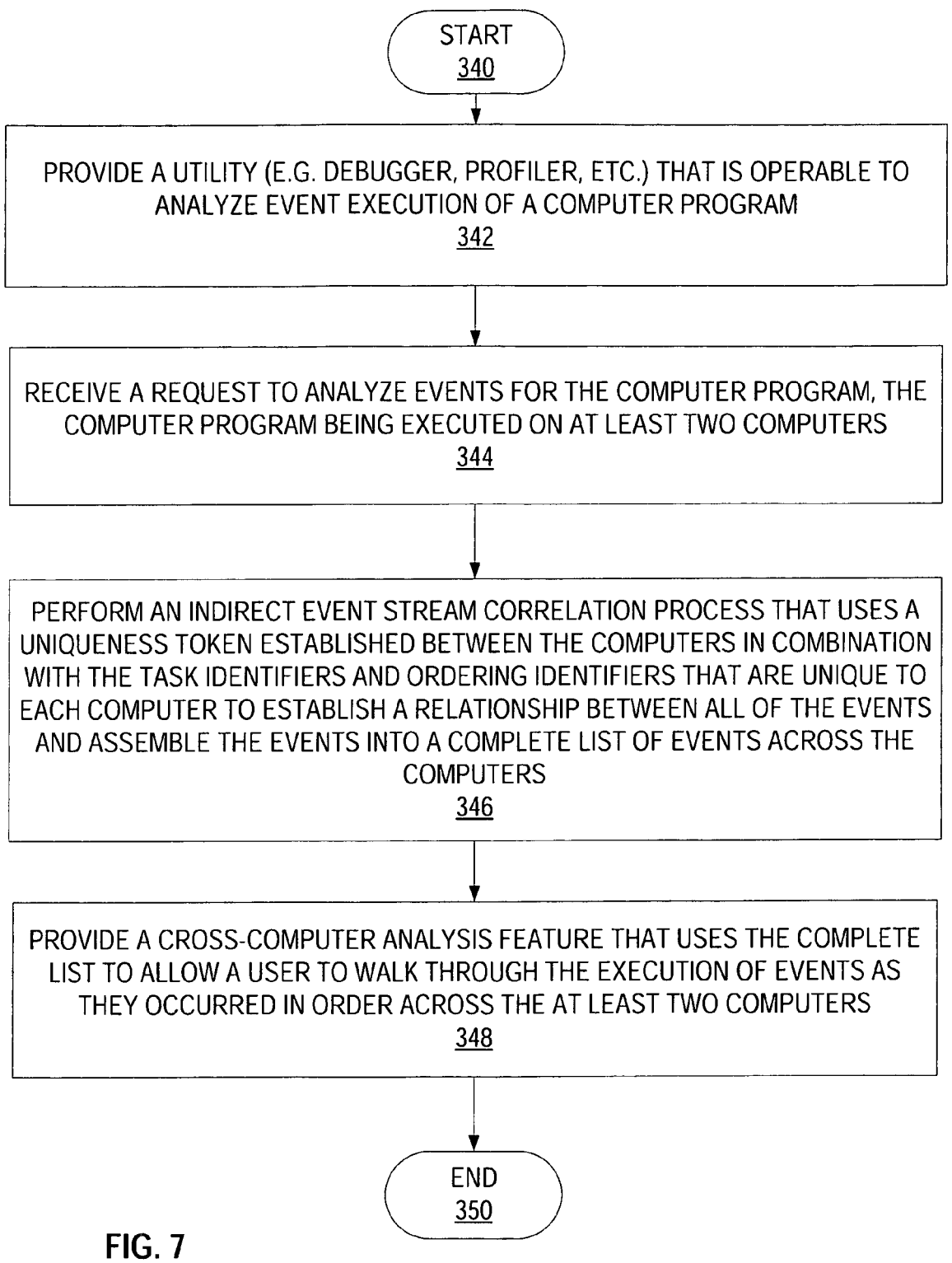
FIG. 7 is a process flow diagram that illustrates one implementation of the stages involved in providing a utility that can display event execution across computers.

FIG. 7 illustrates one implementation of the stages involved in providing a utility that can display event execution across computers. In one form, the process of FIG. 7 is at least partially implemented in the operating logic of computing device 100. The procedure begins at start point 340 with providing a utility (e.g. debugger, profiler, etc.) that is operable to analyze event execution of a computer program (stage 342). The system receives a request to analyze events for a particular computer program, the particular computer program being executed on at least two computers (stage 344). An indirect event stream correlation process is performed that uses a uniqueness token established between the computers in combination with the task identifiers and ordering identifiers that are unique to each computer to establish a relationship between all of the events (stage 346). The events are then assembled into a complete list of events across the computers (stage 346). A cross-computer analysis feature is provided that uses the complete list to allow a user to walk through the execution of events as they occurred in order across the at least two computers (stage 348). The process ends at end point 350.

Figure 8:
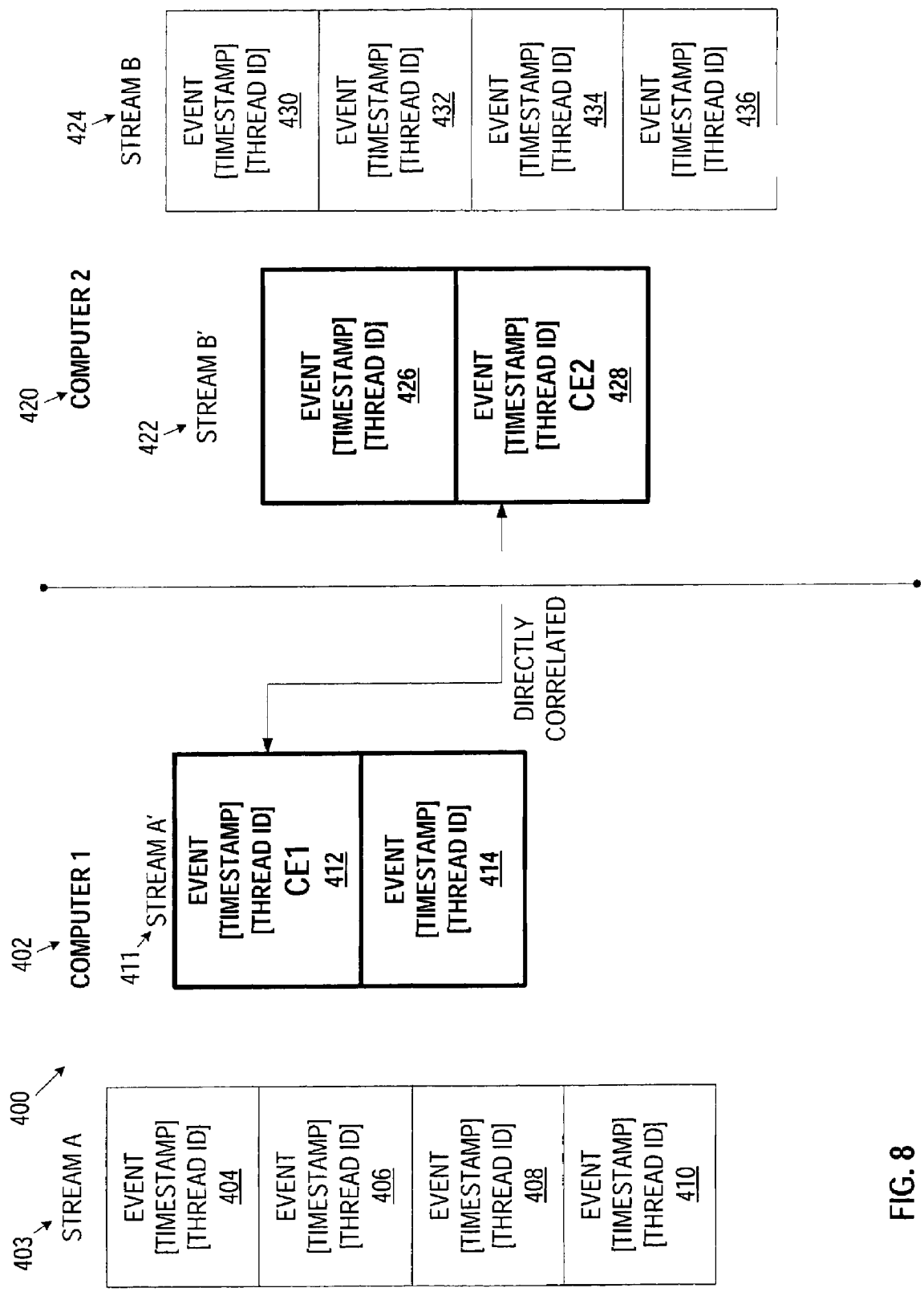
FIG. 8 is a diagram that illustrates exemplary event streams on two computers that have a single direct correlation between them.
Figure 9:
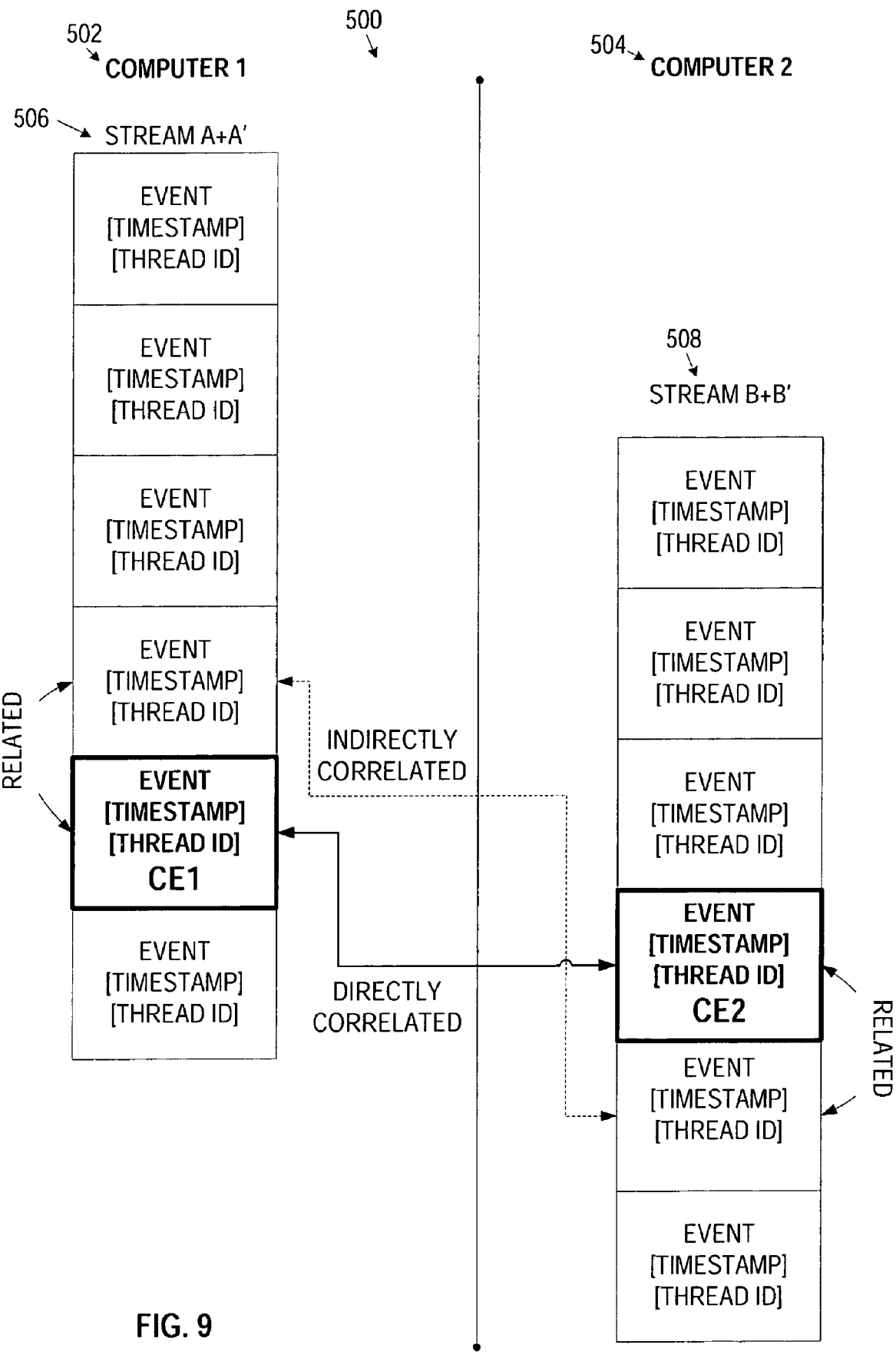
FIG. 9 is a diagram that illustrates how the single direct correlation can be used in combination with other details unique to each computer to indirectly correlate the entire event list into a complete order of execution.

FIGS. 8 and 9 will now be described to illustrate how the technologies and techniques described in the procedures of FIGS. 3-7 can be used to correlate events on two computers into a single event list. FIG. 8 illustrates exemplary event streams on two computers that have a single direct correlation between them. FIG. 9 illustrates how the single direct correlation can be used in combination with other details unique to each computer to indirectly correlate the entire event list into a complete order of execution. FIG. 8 is a diagram 400 that illustrates two event streams (403 and 411) on computer 1 (402), and two event streams (422 and 424) on computer 2 (420). In one implementation, streams A (403) and B (424) contain similar events, such as code execution events, and streams A' (411) and B' (422) contain event tracing events.

Event stream A (403) on computer 1 (402) contains various events (404, 406, 408, and 410, respectively). Event stream A' (411) on computer 1 (402) contains two events (412 and 414, respectively). Similarly, computer 2 (420) contains event stream B (424) with various events (430, 432, 434, and 436, respectively). Computer 2 (420) also includes event stream B' (422) with two events (426 and 428, respectively). Event CE1 (412) on computer 1 (402) is directly correlated (e.g. causally related to) with event CE2 (428) on computer 2 (420). In one implementation, this direct correlation can be established when Event CE1 (412) executes a call to event CE2 (428) and passes a unique token (such as a unique GUID). That unique token allows those two events to be ordered with respect to each other across the two computers.

Turning now to FIG. 9, with continued reference to FIG. 8, by using this direct correlation, the rest of the events can be indirectly correlated into an entire event list 500. The timestamp and thread identifiers are unique with respect to each machine, and thus are not valid across streams. However, the timestamp and thread ID on all of the events (404, 406, 408, 410, 412, and 414) on computer 1 (402) allow them to be placed in order into a single stream 506 for computer 1 (502 on FIG. 9, 402 on FIG. 8). Since A and A' are on the same machine, the identifiers in the two streams are valid for purposes of the comparison. The same is true for B and B': the timestamp and thread ID on all of the events (426, 428, 430, 432, 434, and 436) on computer 2 (420) allow them to be placed in order into a single stream 508 for computer 2 (504 on FIG. 9, 420 on FIG. 8). Upon using the two separate lists in combination with the direct correlation between event CE1 on computer 1 and CE2 on computer 2, the entire event list can be established.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for indirectly correlating event streams on multiple computers comprising the steps of:
    assembling a plurality of events from a plurality of data streams from a first computer into a first computer execution list based upon a respective task identifier and a respective order identifier assigned to each of the events on the first computer;
    assembling a plurality of events from a plurality of data streams from a second computer into a second computer execution list based upon a respective task identifier and a respective order identifier assigned to each of the events on the second computer;
    using a uniqueness token to establish a direct relationship between the first computer execution list and the second computer execution list; and
    creating a complete list of ordered events by combining the first computer execution list and the second computer execution list in a correct order.

2. The method of claim 1, further comprising:
    prior to assembling the events from the plurality of data streams from the first computer, retrieving event details for the plurality of data streams from the first computer.

3. The method of claim 1, further comprising:
    prior to assembling the events from the plurality of data streams from the second computer, retrieving event details for the plurality of data streams from the second computer.

4. The method of claim 1, wherein the uniqueness token appears in at least one event on the first computer and at least one event on the second computer.

5. The method of claim 1, further comprising:
    wherein the uniqueness token is a unique GUID.

6. The method of claim 1, further comprising:
    using the complete list with a process to allow a user to walk through an execution of events in order across the first computer and the second computer.

7. The method of claim 1, wherein the complete list is assembled upon request from a user to analyze an event execution of a particular computer program that executes on the first computer and the second computer.

8. The method of claim 7, wherein prior to receiving the request from the user to analyze the event execution, a logging operation is performed that records the plurality of data streams from the first computer and the plurality of data streams from the second computer.

9. A computer-readable medium having computer-executable instructions for causing a computer to perform the steps recited in claim 1.

10. A method for providing event review across multiple computers comprising the steps of:
    providing a utility that is operable to analyze event execution of a computer program;
    receiving a request to analyze events for the computer program, the computer program being executed on at least two computers;
    performing an indirect event stream correlation process to use a uniqueness token established between the computers in combination with task identifiers and ordering identifiers for each task to establish a relationship between the events, the task identifiers and ordering identifiers being unique to each computer; and
    using the indirect event stream correlation process to further assemble the events into a complete list of events across the computers.

11. The method of claim 10, further comprising:
    providing a cross-computer analysis feature that uses the complete list to allow a user to walk through the execution of events as the events occurred in order across the computers.

12. The method of claim 10, wherein prior to receiving the request to analyze events for the computer program, a logging operation is performed to log the events from the computer program.

13. The method of claim 12, wherein after the computer program is launched, the events for the computer program are recorded to the two computers based upon where the events executed.

14. The method of claim 10, wherein the task identifiers provide a unique way of identifying a particular process on a respective computer.

15. The method of claim 10, wherein the order identifiers provide a way of ordering the events in an order in which the events were executed on a respective one of the computers.

16. The method of claim 10, wherein the order identifiers are timestamp values.

17. A computer-readable medium having computer-executable instructions for causing a computer to perform the steps recited in claim 10.

18. A computer-readable medium having computer-executable instructions for causing a computer to perform steps comprising:
    retrieve event details for two or more data streams from a first computer, the event details including a respective task identifier and respective ordering identifier for each event in the data streams on the first computer to allow each event on the first computer to be correlated with other events on the first computer;
    retrieve event details for two or more data streams from a second computer, the event details including a respective task identifier and respective ordering identifier for each event in the data streams on the second computer to allow each event on the second computer to be correlated with other events on the second computer;
    retrieve a uniqueness token that is contained in at least one event on the first computer and on the second computer, the uniqueness token providing direct correlation information that describes how the particular event on the first computer is directly correlated to the particular event on the second computer; and
    perform an indirect event stream correlation process that uses the directly correlated information in combination with the respective task identifiers and respective ordering identifiers from the first computer and the second computer to establish an ordering between the events on the first computer and the events on the second computer.

19. The computer-readable medium of claim 18, wherein the indirect event stream correlation process is operable to allow a user to debug an application across the first computer and the second computer.

20. The computer-readable medium of claim 18, wherein the indirect event stream correlation process is operable to allow a user to profile an application across the first computer and the second computer.

\* \* \* \* \*